US012702214B2

(12) United States Patent
Atlason et al.

(10) Patent No.: US 12,702,214 B2
(45) **Date of Patent: *Aug. 11, 2026**

(54) SURFACE-MOUNTABLE RAZOR HOLDER

(71) Applicant: Edgewell Personal Care Brands, LLC, Chesterfield, MO (US)

(72) Inventors: Hlynur Vagn Atlason, New York, NY (US); Jason Bravman, New York, NY (US); Georgina Gooley, Brooklyn, NY (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,815

(22) Filed: Dec. 7, 2023

(65) Prior Publication Data

US 2024/0108117 A1 Apr. 4, 2024

Related U.S. Application Data

(63) Continuation of application No. 17/808,353, filed on Jun. 23, 2022, now Pat. No. 11,871,830, which is a (Continued)

(51) Int. Cl.
*A45D 27/22* (2006.01)
*A45D 27/29* (2006.01)
(Continued)

(52) U.S. Cl.
CPC .......... *A45D 27/29* (2013.01); *B26B 19/3833* (2013.01)

(58) Field of Classification Search
CPC ........ A45D 27/29; A45D 27/22; A45D 27/46; A45D 27/48
USPC ..... 248/683, 688, 110, 111, 146, 206.5, 212, 248/205.3, 309.1, 309.4, 310, 311.2, 312, 248/314, 346.01, 346.03, 346.5; 211/13.1, 87.01, 70.7; 30/541; 206/228
See application file for complete search history.

(56) References Cited

U.S. PATENT DOCUMENTS 1,366,528 A 1/1921 Ferguson
1,775,518 A * 9/1930 Forbes .................. A45D 27/22 30/538

(Continued)

FOREIGN PATENT DOCUMENTS

DE 202014005075 U1 7/2014
GB 2218368 A 11/1989
WO 2008052228 A1 5/2008

OTHER PUBLICATIONS

Examination Report No. 2 issued on Mar. 1, 2024, in Australian Patent Application No. 2018345404.

(Continued)

*Primary Examiner* — Terrell L McKinnon
(74) *Attorney, Agent, or Firm* — Edgar Rodriguez

(57) ABSTRACT

A surface-mountable holder includes a rear surface adapted to e coupled with an affixing mechanism for mounting to an external surface. The surface-mountable holder further indicates a front surface configures to magnetically secure a shaving razor. The front surface is adapted to receive an upper handle portion of the shaving razor. The upper handle portion is in close proximity to a razor portion of the shaving razor.

20 Claims, 8 Drawing Sheets

Related U.S. Application Data continuation of application No. 16/731,623, filed on Dec. 31, 2019, now abandoned, which is a continuation of application No. 16/438,159, filed on Jun. 11, 2019, now Pat. No. 10,631,612, which is a continuation of application No. 16/140,249, filed on Sep. 24, 2018, now Pat. No. 10,357,093.

(60) Provisional application No. 62/567,031, filed on Oct. 2, 2017.

(51) Int. Cl.

| | |
|---|---|
| ***A45D 27/46*** | (2006.01) |
| ***A45D 27/48*** | (2006.01) |
| ***B26B 19/38*** | (2006.01) |

(56) References Cited

U.S. PATENT DOCUMENTS 1,782,033 A * 11/1930 Forbes ................... A45D 27/22 206/208
2,385,859 A 10/1945 Jacobson
D145,084 S 6/1946 Hutt et al.
2,414,653 A * 1/1947 Lookholder ............. A47K 1/09 211/DIG. 1
D150,507 S 8/1948 Mcentire
2,457,421 A * 12/1948 Warren ................ B43M 99/009 211/DIG. 1
2,471,825 A 5/1949 Long
2,474,899 A 7/1949 Hutt
2,616,647 A 11/1952 Murchison
2,635,843 A 4/1953 Small
2,639,880 A 5/1953 Belloff
2,792,108 A * 5/1957 Keller .................. B24D 15/085 30/538
D181,876 S 1/1958 Nolan et al.
2,845,245 A 7/1958 Gray et al.
2,883,062 A 4/1959 Rosemark
2,960,237 A * 11/1960 McEnery ............... A45D 27/29 211/13.1
3,229,820 A * 1/1966 Hentzi ..................... B25H 3/04 248/309.4
3,239,178 A * 3/1966 Pompa .................. F16B 47/003 211/1
3,337,100 A 8/1967 Berning
3,842,980 A * 10/1974 Kushner .................. B25H 3/04 211/DIG. 1
D237,666 S 11/1975 Iten et al.
D238,529 S 1/1976 Muller et al.
4,120,073 A 10/1978 Studebaker
D251,970 S 5/1979 Fujita
D253,144 S * 10/1979 Heckler ......................... D6/534
D253,150 S * 10/1979 Heckler ......................... D6/527
4,198,745 A 4/1980 Moehlenpah
D259,226 S 5/1981 Lester
4,275,862 A 6/1981 Takagi et al.
D277,434 S 2/1985 Iten
4,523,599 A * 6/1985 Collet .................... A46B 17/08 132/313
D283,076 S 3/1986 States, Jr.
4,644,645 A 2/1987 Audet
D294,903 S 3/1988 Pokorny
4,773,158 A 9/1988 Kertzman
4,784,360 A 11/1988 Mok
4,945,598 A 8/1990 Racioppi
5,013,074 A 5/1991 Galle
5,064,159 A 11/1991 Kotick
5,065,918 A 11/1991 Chun et al.
5,083,733 A 1/1992 Marino
5,163,566 A 11/1992 Hempel
D333,583 S 3/1993 Hurd
5,457,887 A 10/1995 Grange
D369,709 S * 5/1996 Triplett .......................... D6/526
D370,375 S 6/1996 Murgida et al.
5,615,858 A 4/1997 Sferruza, Jr.
5,806,669 A 9/1998 Kim
5,848,475 A 12/1998 Hill et al.
5,903,978 A * 5/1999 Prochaska ............. B26B 21/522 30/34.05
D423,845 S 5/2000 Coffin et al.
6,076,790 A * 6/2000 Richter ............... B60R 11/0241 248/309.4
6,415,517 B1 7/2002 Worrick, III
D464,222 S 10/2002 Coffin et al.
D494,795 S 8/2004 Bunnell et al.
D495,179 S 8/2004 Bunnell et al.
7,040,024 B2 5/2006 Lukan
7,275,461 B2 * 10/2007 Gherman ............... B24D 15/10 76/82
7,506,854 B2 3/2009 Lukan
7,654,003 B2 2/2010 Simms
7,971,736 B1 7/2011 Stewart
8,205,846 B2 6/2012 Glunk
8,297,569 B2 10/2012 Kuhn et al.
8,540,197 B1 9/2013 Krol, II et al.
8,550,235 B2 10/2013 Suderman
8,573,548 B2 11/2013 Kuhn et al.
8,662,463 B2 3/2014 Chen et al.
8,936,222 B1 1/2015 Bastian et al.
9,157,573 B1 10/2015 Zach et al.
9,730,500 B1 * 8/2017 Provost .................. A45D 27/29
10,104,950 B1 * 10/2018 Provost .................. A45D 27/29
10,357,093 B2 * 7/2019 Atlason ............... B26B 19/3833
10,505,392 B2 12/2019 Mcsweyn et al.
10,631,612 B2 * 4/2020 Atlason .................. A45D 27/29
11,871,830 B2 * 1/2024 Atlason .................. A45D 27/29
2002/0153863 A1 10/2002 Arndt
2002/0175131 A1 11/2002 Johnson
2003/0070998 A1 * 4/2003 Bulka ...................... A47K 1/09 211/94.01
2004/0188576 A1 9/2004 Carnevali
2004/0200080 A1 10/2004 Lauri
2006/0032055 A1 * 2/2006 Simms .................. B26B 21/405 30/34.05
2007/0074603 A1 4/2007 Gherman et al.
2007/0220754 A1 9/2007 Barbaro et al.
2009/0056141 A1 3/2009 Barry et al.
2009/0255123 A1 * 10/2009 Tomassetti ............. A45D 27/29 30/34.05
2009/0255833 A1 10/2009 Frost
2010/0257744 A1 * 10/2010 Malkewich ............. B26B 21/40 30/538
2015/0314464 A1 * 11/2015 Guzak ................... B26B 21/521 30/526
2015/0320178 A1 11/2015 Fish
2017/0043492 A1 2/2017 Robertson et al.
2017/0282391 A1 10/2017 Provost et al.
2018/0079095 A1 3/2018 Robertson et al.
2018/0159369 A1 6/2018 Mcsweyn et al.
2018/0160790 A1 * 6/2018 Swatty ................. A45D 27/225
2022/0088811 A1 * 3/2022 Sims ..................... B26B 21/521
2022/0175108 A1 * 6/2022 Desmarais ............. F16M 13/02

OTHER PUBLICATIONS

International Search Report and Written Opinion dated Feb. 19, 2019, on application No. PCT/US2018/052483.
Examination Report No. 1 issued on Aug. 1, 2023, in Australian Patent Application No. 2018345404.

* cited by examiner

SURFACE-MOUNTABLE RAZOR HOLDER

RELATED APPLICATIONS

This application is a continuation application of U.S. patent application Ser. No. 17/808,353, filed Jun. 23, 2022, which is a continuation application of U.S. patent application Ser. No. 16/731,623, filed Dec. 31, 2019, which is a continuation application of U.S. patent application Ser. No. 16/438,159, filed Jun. 11, 2019, now U.S. Pat. No. 10,631, 612, which is a continuation application of U.S. patent application Ser. No. 16/140,249, filed Sep. 24, 2018, now U.S. Pat. No. 10,357,093. which claims the benefit of U.S. Provisional Patent Application No. 62/567,031, filed Oct. 2, 2017, the contents of which are incorporated by reference herein in their entireties.

TECHNICAL FIELD

This disclosure relates generally to holding devices and, more particularly, to a shaving razor holder for securing a safety shaving razor when not in use.

BACKGROUND

Existing wall mountable razor holders fall into three broad groups. In the first group, a pair of horizontally spaced arms extends from a wall mounting structure and simply suspends the razor from the wide part of the razor and with the widest end, usually the cartridge end, at the top. Examples of this first group include holders disclosed in: U.S. Pat. No. 4,773,158 to Kertzman; U.S. Pat. No. 7,506, 854 to Lukan; U.S. Design Pat. No. D333,583 to Hurd; and U.S. Design Pat. No. D294,903 to Pokorny. In a second group, a single prong extends from a wall mounting structure and this prong connects with a recess or hole in the handle to suspend the razor. Examples of this second group are disclosed in U.S. Design Pat. No. D277,434 to Iten and U.S. Design Pat. Nos. D495,179 and D494,795 both to Bunnell, et al. In a third group, a simple cup extends from a wall mounting structure and the razor is simply placed in the cup, usually with the razor cartridge end of the razor at the top and facing out of the cup to prevent the razor blades of the cartridge contacting any internal part of the cup that might cause damage to the razor blades. Examples of this third group include U.S. Design Pat. Nos. D464,222 and D423,845 both to Coffin, et al. and U.S. Design Pat. No. D370,375 to Murgida, et al.

DETAILED DESCRIPTION

The ergonomic design for existing wall mountable razor holders is suboptimal, as they do not fully expose the razor handle that is intended to be accessed. Rather, in existing wall mountable razor holders, the razor handle is guarded behind prongs, arms, and cups creating unnecessary obstructions for a user to access the razor handle. Such obstructions do not permit a safety shaving razor to be attached and detached in a full range of access paths. For example, the prongs, arms, and/or cups limit the angle that a user can remove and attach the shaving razor from the razor holder.

Therefore, there is a need to provide a surface-mountable (e.g., wall-mountable) holder for a safety razor that may provide unobstructed access (e.g., a 360.degree. access path in an x-y plane substantially parallel to the surface to which the holder is mounted, a full hemisphere of access paths (e.g. 180.degree.) centered at the point of mounting the holder to a surface, etc.) to both affix and remove such safety razor with ease and simplicity. Generally, the present disclosure relates to a surface-mountable holder for removably retaining (e.g., securing, suspending) a safety shaving razor when not in use. The holder may be mounted to a surface (e.g., a wall) that is a planar surface (e.g., disposed along a first plane) in an x-y plane, where the z-direction is going into the planar surface and moving away from the planar surface.

Figure 13:
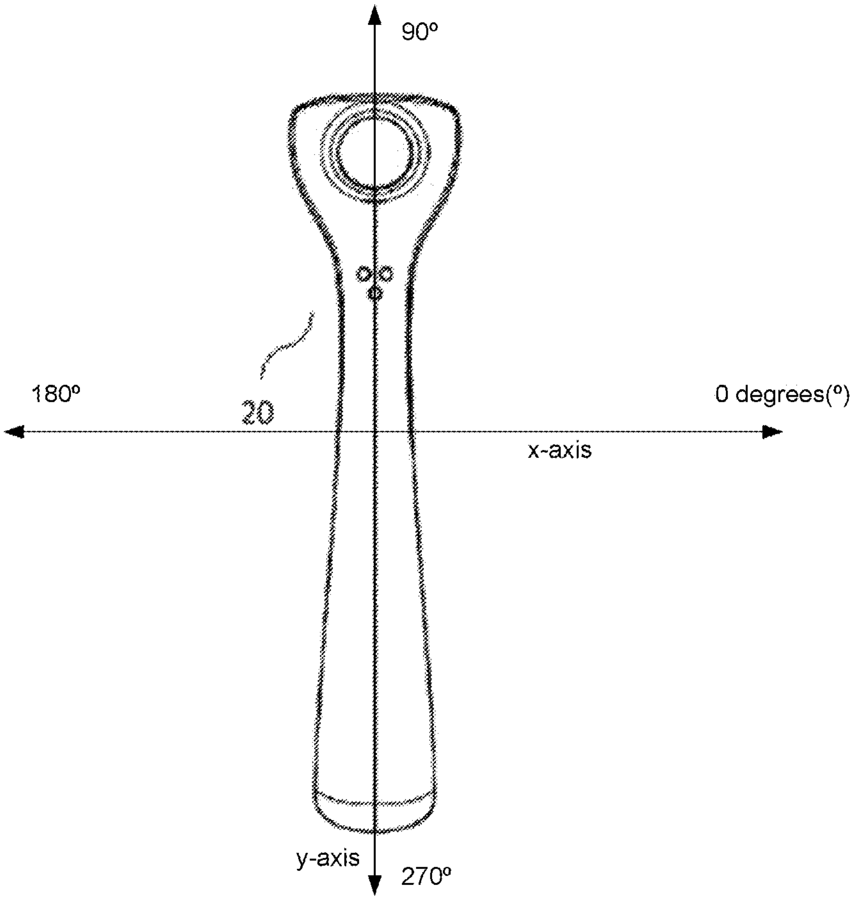
FIG. 13 is a front view of the razor retained on a holder and a 360-degree access path in an x-y plane, according to one embodiment.

In some embodiments, unobstructed access to affix and remove a safety razor includes affixing and removing the safety razor in a full 360.degree. access path in an x-y plane substantially parallel to the surface to which the holder is mounted. FIG. 13 illustrates a razor 20 retained on a holder against a planar surface in an x-y plane, according to certain embodiments. The surface (e.g., a wall) may be in a first plane that is an x-y plane. A 360.degree. access path may include any angle (e.g., anywhere between 0.degree. and 360.degree.) in the x-y plane. For example, the safety razor 20 may be affixed to the holder by approaching from a 0.degree. angle, a 90.degree. angle, a 270.degree. angle, etc. in an x-y plane. In another example, the safety razor 20 may be removed from the holder from a 0.degree. angle, a 90.degree. angle, a 270.degree. angle, etc. in an x-y plane. The safety razor 20 may be removed by moving the safety razor 20 away from the holder in the z-direction. The safety razor 20 may be attached to the holder by moving the safety razor 20 towards the holder in the z-direction.

Figure 14:
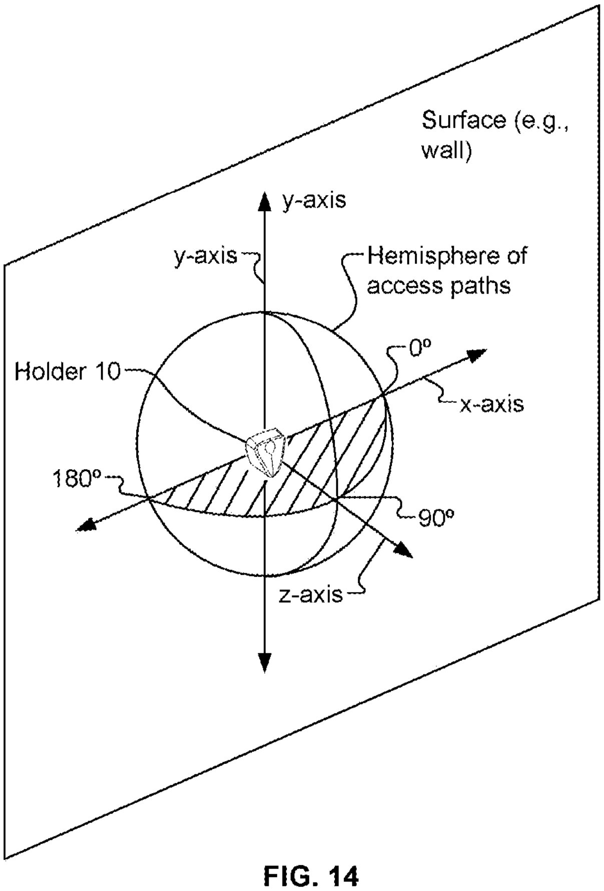
FIG. 14 is a perspective view of the holder and a hemisphere of access paths, with a razor retained therein, according to one embodiment.

In some embodiments, unobstructed access to affix and remove the safety razor includes affixing and removing the safety razor in a 180.degree. access path (e.g. a full hemisphere of access paths) within a sphere centered at the point (e.g., central point) of mounting the holder to a surface (e.g., wall). FIG. 14 illustrates a razor holder 10 mounted to a surface at the origin of an x-y-z coordinate system. The surface is in the x-y plane and the z-direction is going into the surface and moving away from the surface.

The razor holder is mounted to the external surface at a first point (e.g., origin of the x-y-z axis) on a first side of the external surface. Access paths from the first point create a sphere of access paths centered about the first point. A hemisphere of access paths corresponds to half of the sphere disposed on the first side of the external surface. The surface-mountable razor holder may secure the shaving razor without obstructing the hemisphere of access paths to remove the shaving razor from the surface-mountable razor holder and affix the shaving razor to the surface-mountable razor holder.

The external surface is disposed along a first plane that includes a first point corresponding to the mounting of the holder to the planar surface. A second plane intersects the first plane at the first point and creates a 180.degree. angle (a line) at the intersection with the first plane. For example, the x-z plane intersects the central point and creates a 180.degree. angle along the x-axis.

For the 360.degree. angle centered at the central point and disposed on the second plane (e.g., the x-z plane), a first 180.degree. are outside of the wall (e.g., see hatched portion of FIG. 14) and a second 180.degree. are within the wall. The razor may be accessed (e.g., removed from and attached to the holder) via a full unobstructed 180.degree. (e.g., at any angle of the 180.degree. outside of the wall) in the second plane.

For example, for a second plane that is horizontal (the x-z plane), the razor may be removed from the holder by pulling the razor towards the right (at a 0.degree. angle), by pulling the razor straight out away from the wall (at a 90.degree. angle), by pulling the razor towards the left (at a 180.degree. angle), or any other angle in between. The razor may be attached to the holder by the razor approaching the holder from the right (0.degree. angle), by approaching holder straight on (e.g., at a 90.degree. angle), by approaching the holder from the left (e.g., at a 180.degree. angle), or any other angle in between. (See hatched area of FIG. 14 for angles of access from 0.degree. to 180.degree. in the x-z plane.) In another example, for a second plane that is vertical (e.g., the z-y plane), the razor may be removed from the holder by pulling the razor down (e.g., at a 0.degree. angle), by pulling the razor straight out away from the wall (at a 90.degree. angle), by pulling the razor up (180.degree. angle), or any other angle in between. The razor may be attached to the holder by the razor approaching the holder from below (e.g., at a 0.degree. angle), by approaching the holder straight on (e.g., at a 90.degree. angle), by approaching the holder from above (e.g., at a 180.degree. angle), or any other angle in between.

The shaving razor being removable from and attachable to the front surface of the surface-mountable razor holder in a full hemispherical access path includes the shaving razor being accessible via a full unobstructed access path (e.g., without obstruction by prongs, arms, a cup, etc.) along any plane (horizontal, vertical, diagonal, etc.) that intersects the planar surface (e.g., wall) at the first point corresponding to the mounting of the holder to the planar surface (e.g., the razor may be removed from the holder at any angle other than pushing the shaving razor into the holder or surface to which the holder is mounted).

A safety shaving razor may include a razor handle that is coupled to one or more blades. In one implementation, the one or more blades are housed within a razor head that is integral to the razor handle. In another implementation, the one or more blades are housed within a razor head that is removably coupled to the razor handle. The safety shaving razor may be used to sever hair from skin without cutting the skin.

The present disclosure features a shaving razor holder comprising a molded front exterior with contours that substantially match its razor handle counterpart. Such molded exterior is connected with a surface-mountable back panel containing a ferrous magnet inserted into a cavity. The cavity may be a cylindrical cavity. Such ferrous magnet extends to the front edge of the molded front exterior. In a further aspect of the present disclosure, the surface-mountable holder removably connects with a safety razor (e.g., a razor handle of a safety shaving razor) containing ferrous material.

In some implementations, the ferrous magnet is self-contained within the molded front component, or within a single component design. The function of the ferrous magnet may be equivalent in either instance.

Figure 1:
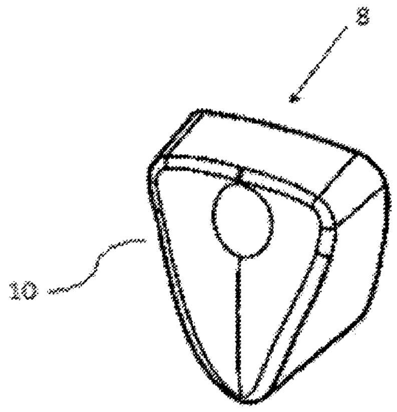
FIG. 1 is a perspective view of a shaving razor holder, according to one embodiment.
Figure 2:
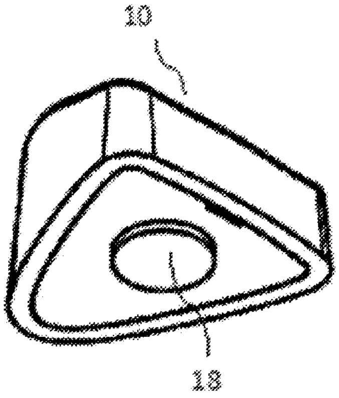
FIG. 2 is a rear perspective view of the holder, according to one embodiment.
Figure 3A:
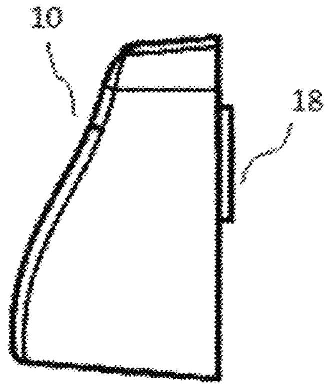
FIG. 3A is a side view of the holder, according to one embodiment.
Figure 3B:
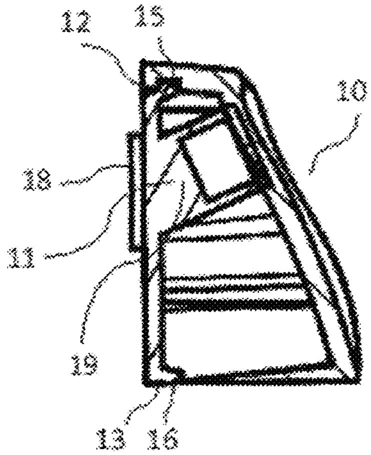
FIG. 3B is a section view of the holder taken along sectional indicator 8 shown in FIG. 1, according to one embodiment.
Figure 4:
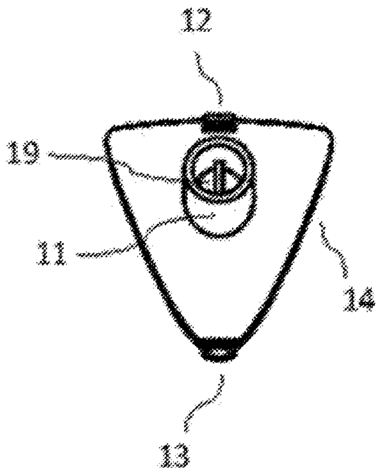
FIG. 4 is a front view of the holder's back mounting component, according to one embodiment.
Figure 5:
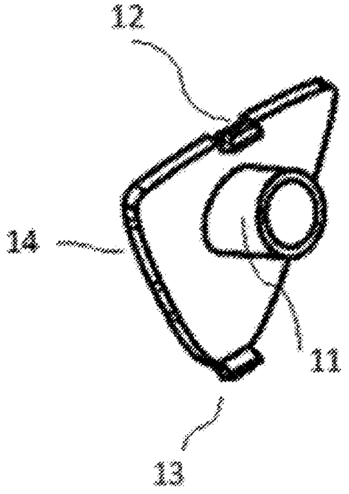
FIG. 5 is a front perspective view of the holder's back mounting component, according to one embodiment.
Figure 6:
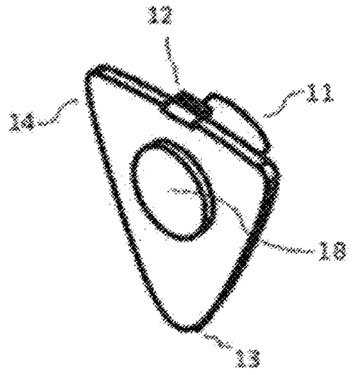
FIG. 6 is a rear perspective view of the holder's back mounting component, according to one embodiment.
Figure 7:
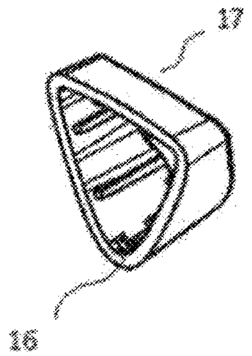
FIG. 7 is a rear perspective view of the holder's front component, according to one embodiment.
Figure 8:
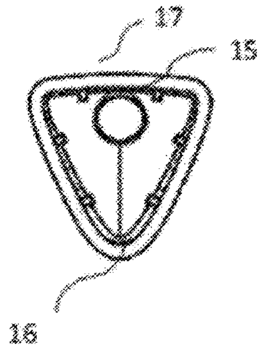
FIG. 8 is a rear view of the holder's front component, according to one embodiment.
Figure 9:
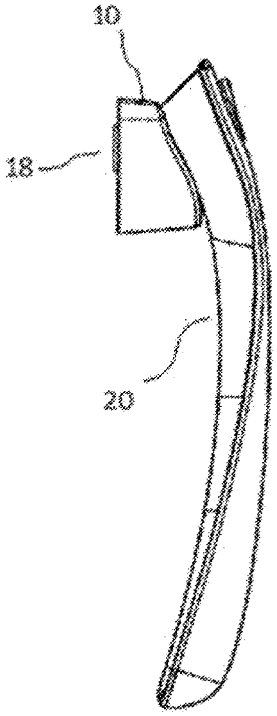
FIG. 9 is a side view of the holder, with a razor retained thereon, according to one embodiment.
Figure 10:
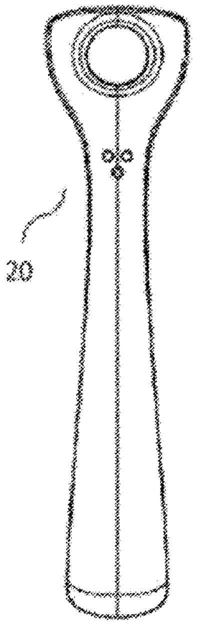
FIG. 10 is a front view of the holder, with a razor retained thereon, according to one embodiment.
Figure 11:
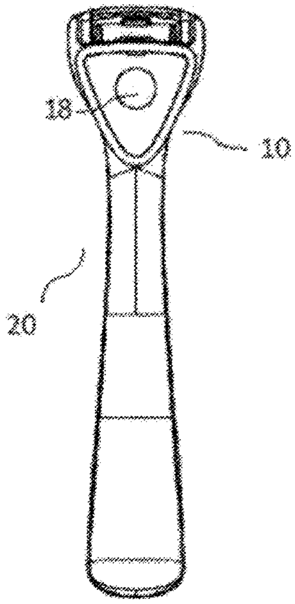
FIG. 11 is a rear view of the holder, with a razor retained thereon, according to one embodiment.
Figure 12:
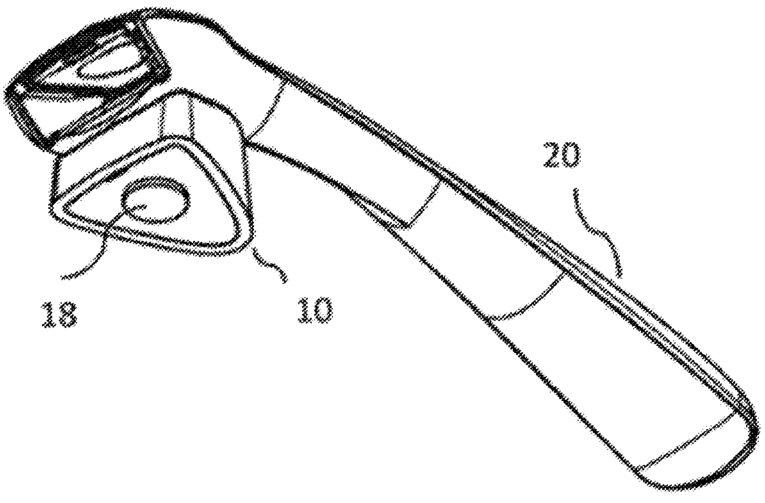
FIG. 12 is a rear perspective view of the holder, with a razor retained therein, according to one embodiment.

Referring to FIGS. 1-12, a razor holder 10 is configured to secure a safety shaving razor 20 (e.g., FIG. 9). The holder 10 may include two interconnecting components: a rear-facing component 14 (back component), which may mount to a surface (e.g., a wall), and a front-facing component 17 (front component), which may couple (e.g., magnetically couple, via magnetic attraction) with a shaving razor 20. A cylindrical member 11 may extend from the inner wall of the rear-facing component 14 and may contain a ferrous magnet which extends to the front edge of the front-facing component 17. The rear-facing component 14 may include a cylindrical member 11 extending from a first inner surface of the rear-facing component 14. The cylindrical member may extend towards a second inner surface of the front-facing component 17 responsive to the front-facing component 17 engaging with the rear-facing component. The cylindrical member may form a cavity and the magnet may be disposed in the cavity. In one embodiment, a vertical ribbing structure 19 (e.g., a structure that protrudes within the cylindrical member 11) is positioned within cylindrical member 11 in order to receive and position the ferrous magnet. For example, the ribbing structure 19 may be a protruding structure within the cylindrical member 11 that regulates the height of the ferrous magnet to position the ferrous magnet proximate the front-facing component 17.

In one embodiment, the rear-facing component 14 is configured to be press fit into the front-facing component 17 via protruding clips 12 and 13 extending from the rear-facing component 14 and interconnecting with receiving members 15 and 16 within the front-facing component 17. In another embodiment, the rear-facing component 14 may be integrally molded with the front-facing component 17. In another embodiment, the rear-facing component 14 may be mechanically attached (e.g. ultrasonically welded or similar) to the front-facing component 17. In another embodiment, the rear-facing component 14 may be chemically attached (e.g., glued with adhesive) to the front-facing component 17.

The front-facing component 17 may be molded generally to conform to the shape of its counterpart shaving razor 20 (e.g., substantially match the shape of the outer surface of the front-facing component 17). Such counterpart shaving razor 20 may include a corresponding ferrous magnet or metal component which can be affixed, implanted or co-molded into such shaving razor handle to ensure proper interaction with the magnet when the handle is affixed to the holder 10. The magnetic interaction provides a retention force so that the shaving razor handle is securely held on the holder 10, but the retention force would not be so strong as to unduly complicate the removal of the shaving razor handle from the holder 10 when desired, e.g. as when initiating shaving. For example, the magnetic interaction may allow the shaving razor handle to snap to the holder 10 when the shaving razor handle is in proximity of the holder 10. The magnetic interaction may retain the shaving razor handle even when water is sprayed on the holder 10 and shaving razor handle (e.g., from a faucet). The magnetic interaction may retain the shaving razor handle even when a user bumps into the shaving razor handle. The magnetic interaction may allow removal of the shaving razor handle from the holder 10 by use of one hand of a user (e.g., is not so strong that it requires removable using two hands).

In one embodiment, the rear-facing component 14 is mounted to a wall via an adhesive bond 18 (e.g., with a strong moisture-resistant adhesive putty tack, with a double-sided tape, with another form of adhesion, etc.). In some embodiments, the adhesive bond between the surface (e.g., wall) and the holder 10 may be stronger than the magnetic force between the holder 10 and the shaving razor handle 20. The adhesive bond 18 may resist water (e.g., water being sprayed by a faucet) and bumps (e.g., by a user bumping into the shaving razor handle and/or holder 10). The adhesive bond 18 may be removed from a surface and/or the holder 10 by twisting the adhesive bond 18. The adhesive bond 18 may be reusable. For example, the adhesive bond 18 may be used to mount a holder 10 to a surface, may be removed from the holder 10 and/or surface, and may be reused to mount the holder 10 to a surface.

The holder 10 may be made of any suitable material including, for example, polyethylene terephthalate (PET or PETE), high density (HD) PETE, thermoplastic polymer, polypropylene, oriented polypropylene, polyurethane, polystyrene, acrylonitrile butadiene styrene (ABS), polyvinyl chloride (PVC), polytetrafluoroethylene (PTFE), polyester, metal, synthetic rubber, natural rubber, silicone, nylon, polymer, wood, antibacterial or antimicrobial materials, insulating, thermal, other suitable sustainable or biodegradable materials, or any combination thereof. Furthermore, it should be understood that the holder 10 may be constructed of material that could be colored or plated to look like metal, wood, or other materials.

Other Embodiments

Embodiments have been described in the present disclosure. Nevertheless, it will be understood that various modifications may be made without departing from the spirit and scope of the present disclosure. For example, the holder may be affixed to a wall via a suction cup, double sided mounting tape, screws, or nails.

The invention claimed is:

1. A combination comprising:

a safety razor having one or more blades housed within a razor head that is removably coupled to a handle of the safety razor, the handle containing therein a ferrous material; wherein, in side view, the handle has an interior surface, and opposed longitudinal ends of the interior surface tangentially define an obtuse angle; and a surface-mountable razor holder comprising a rear-facing component having a rear surface to mount the surface-mountable razor holder to an exterior environmental surface; a front-facing component having a front surface to engage the interior surface of the handle; and a magnet contained within a cavity formed between and not extending beyond either of the rear-facing component and the front-facing component, the magnet proximal the front-facing component;

wherein the safety razor is removably secured to the front surface of the holder via attraction of the magnet and the ferrous material.

2. The combination of claim 1, wherein the cavity is cylindrical.

3. The combination of claim 1, wherein the surface-mountable razor holder is integrally formed.

4. The combination of claim 1, wherein the surface-mountable razor holder is mechanically attached, chemically attached, or combinations thereof.

5. The combination of claim 1, wherein the surface-mountable razor holder is a single component.

6. The combination of claim 1, wherein the cavity extends toward an inner surface of the front-facing component.

7. A combination comprising:

a safety razor having one or more blades housed within a razor head that is removably coupled to a handle of the safety razor, the handle containing therein a ferrous material; and a surface-mountable razor holder comprising a rear-facing component having a rear surface to mount the surface-mountable razor holder to an exterior environmental surface; a front-facing component having a front surface to engage the handle, and a magnet contained within a cavity formed between and not extending beyond either of the rear-facing component and the front-facing component, the magnet proximal an inner surface of the front-facing component;

wherein the safety razor is removably secured to the front surface of the holder via attraction of the magnet and the ferrous material, and the front surface is configured such that no part of the safety razor contacts the exterior environmental surface.

8. The combination of claim 7, wherein the surface-mountable razor holder further comprises a cylindrical member extending from the inner surface, and wherein the cylindrical member forms the cavity.

9. The combination of claim 7, wherein the cavity is cylindrical.

10. The combination of claim 7, wherein the surface-mountable razor holder is integrally formed.

11. The combination of claim 7, wherein the surface-mountable razor holder is mechanically attached, chemically attached, or combinations thereof.

12. The combination of claim 7, wherein the surface-mountable razor holder is a single component.

13. The combination of claim 7, wherein the cavity extends toward the inner surface of the front-facing component.

14. A combination, comprising:

a safety razor having one or more blades housed within a razor head that is removably coupled to a handle of the safety razor, the handle containing therein a ferrous material; and a surface-mountable razor holder, comprising a rear-facing component and a front-facing component defining a body therebetween, the front-facing component having front surface with a slope such that a first portion of the front surface has a first height from the rear-facing component, and a second portion of the front surface has a second height from the rear-facing component, the first height being a first distance that is perpendicular from the rear-facing component to the first portion of the front surface, the second height being a second distance that is perpendicular from the rear-facing component to the second portion of the front surface;

a magnet affixed to the surface-mountable razor holder such that the front surface separates the ferrous material from the handle, the front surface extends beyond the magnet;

wherein the first height is different from the second height.

15. The combination of claim 14, wherein the slope is linear.

16. The combination of claim 14, wherein the slope is non-linear.

17. The combination of claim 14, wherein the safety razor is removably secured to the front surface of the surface-mountable razor holder via attraction of the magnet and the ferrous material, and the safety razor is configured to be removably secured when approaching at a zero degree angle from a right side of a front surface on the front-facing component or when approaching at a ninety degree angle from front surface or when approaching at a one-hundred and eighty degree angle from a left side of the front surface.

18. The combination of claim 14, wherein the front surface is configured such that no part of the safety razor contacts an exterior environmental surface upon which the rear-facing component is mounted to.

19. The combination of claim 14, wherein the front surface has a perimeter, wherein the first portion of the front-facing component is located at a first perimeter portion, wherein the second portion of the front-facing component is located at a second perimeter portion.

20. The combination of claim 19, wherein the first height is a minimum height of the surface-mountable razor holder, and the second height is a maximum height of the surface-mountable razor holder.

* * * * *